Dec. 27, 1966 S. H. LATAWIC 3,294,031
FLUID MOTOR SYSTEM
Filed July 28, 1965
2 Sheets-Sheet 1

INVENTOR
STEPHEN H. LATAWIC

BY Olsen and Stephenson
ATTORNEYS

Dec. 27, 1966  S. H. LATAWIC  3,294,031
FLUID MOTOR SYSTEM
Filed July 28, 1965  2 Sheets-Sheet 2
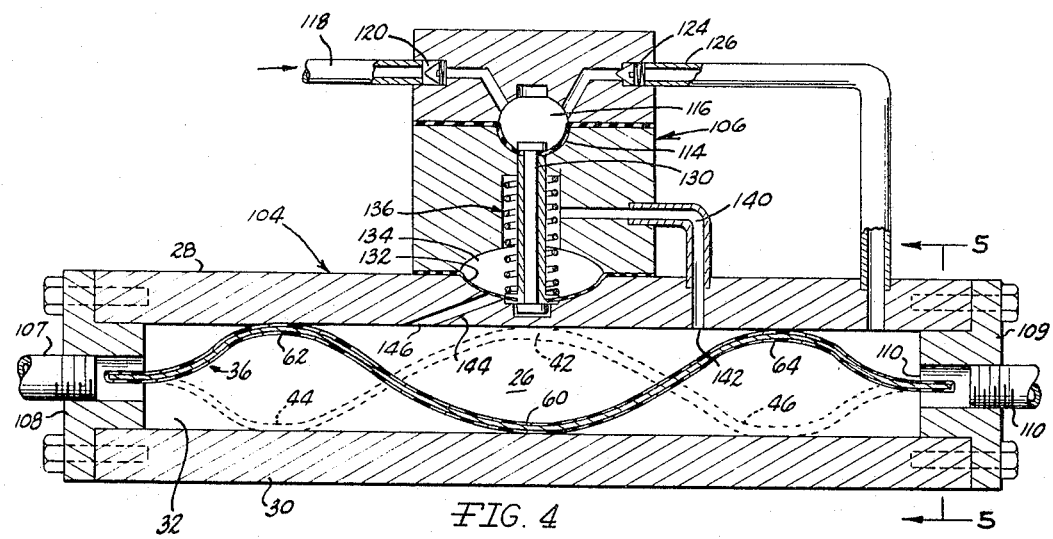
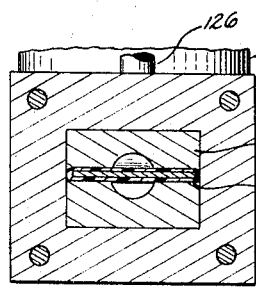
FIG.5
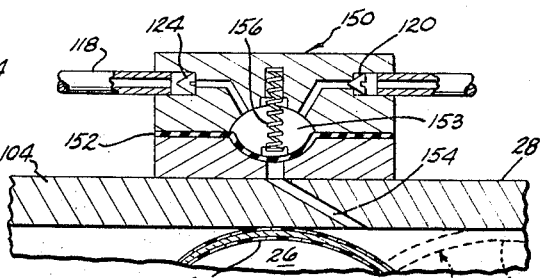
FIG.6
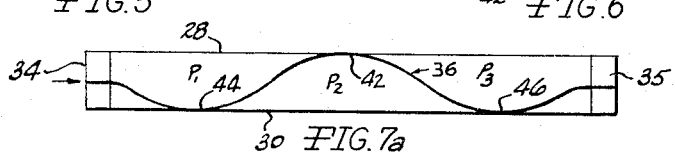
FIG.7a
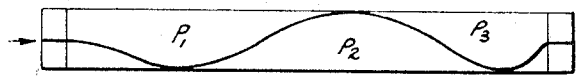
FIG.7b
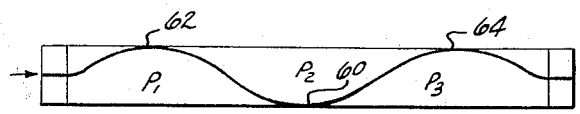
FIG.7c
INVENTOR
STEPHEN H. LATAWIC
BY Olsen and Stephenson
ATTORNEYS

United States Patent Office 3,294,031
Patented Dec. 27, 1966

3,294,031
FLUID MOTOR SYSTEM
Stephen H. Latawic, 2350 Ewald Circle,
Detroit, Mich. 48238
Filed July 28, 1965, Ser. No. 475,350
15 Claims. (Cl. 103—152)

This invention relates generally to fluid motor systems and more particularly to fluid motors particularly suited for use in fluid proportioning systems.

One type of fluid proportioning system includes a main fluid line and a fluid pump arranged to introduce a second fluid into the main line in accordance with a characteristic of fluid flow in the main line. For example, an additive may be introduced into the main fluid at a rate proportional to a flow rate of the main fluid. The fluid proportioning system may include a positive displacement pump for the additive together with a control means which senses the flow rate and controls actuation of the pump either directly or through a motor. In various fluid proportioning systems the means for sensing the flow rate in the main line also serves as a fluid motor so that the fluid in the main line provides a source of energy for actuating the pump.

The objects of this invention are to provide a fluid proportioning system that is constructed simply and economically; that has few moving parts and is dependable and requires little, if any, maintenance; that can be used with explosive, flammable or corrosive liquids; that operates effectively to vary the rate at which a second fluid is introduced into a main fluid in accordance with the flow rate of the main fluid; and that permits locating a pump for the second fluid remote from a main fluid line and is therefore versatile.

Other objects of the present invention are to provide a fluid motor that is particularly suited for use in a fluid proportioning system; that is constructed simply and economically; that has few moving parts and is dependable, requiring little, if any, maintenance; that can be used with explosive, flammable or corrosive liquids; and that effectively provides mechanical output variations related to flow characteristics of a motive fluid.

Other objects, features and advantages of the present invention will become apparent from a consideration of the following description, the appended claims and the accompanying drawings in which:

FIGURE 4 is a vertical section of a pump and motor in a modified fluid proportioning system where the pump is operated by pressure pulsations occurring in the motor as a flexible wall changes states;

FIGURE 5 is a section taken on line 5—5 of FIG. 4;

FIGURE 6 illustrates still a further modification where a diaphragm pump is operated directly by pressure pulsations occurring in a fluid motor constructed substantially similar to the motors illustrated in FIGS. 2 and 4; and FIGURES 7a–7c schematically illustrate a snap action that accompanies undulatory motion of the resiliently flexible wall in the embodiments in FIGS. 2, 4 and 6.

Figure 1:
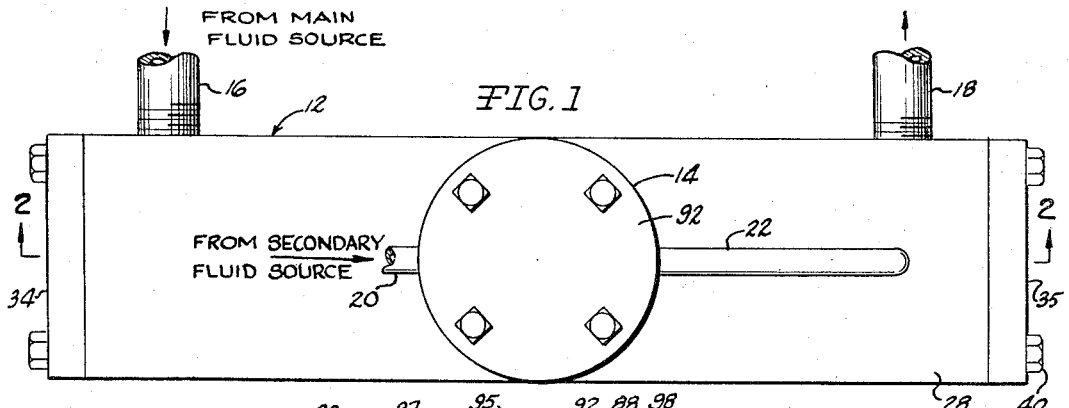
FIGURE 1 illustrates part of a fluid proportioning system having a diaphragm pump operated by a fluid motor to introduce an additive into a main fluid stream in accordance with the flow rate of the main fluid.
Figure 2:
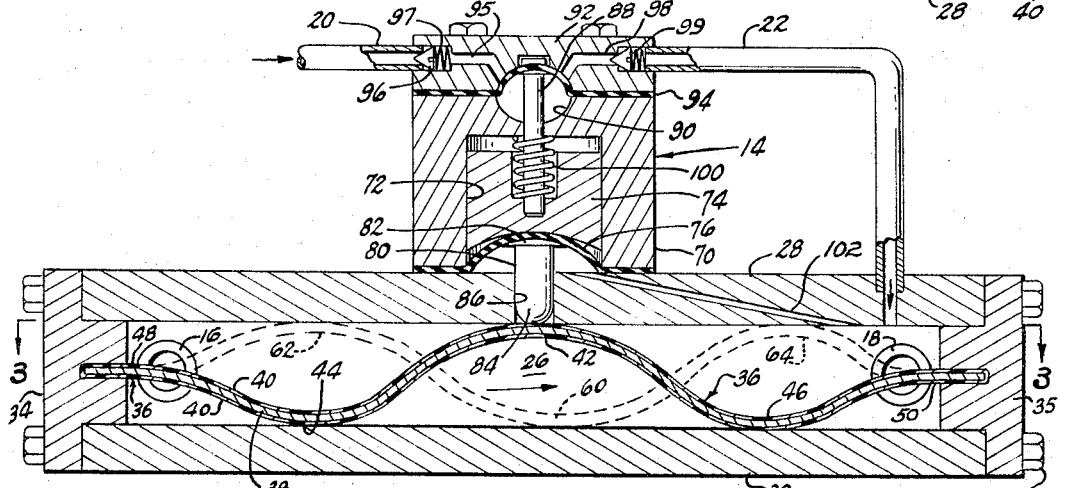
FIGURE 2 is a section taken on line 2—2 to illustrate details of the pump and the motor including a resiliently flexible wall which moves between two stable states actuating a plunger communicating at its outer end exteriorly of the motor housing to in turn actuate the pump.
Figure 3:
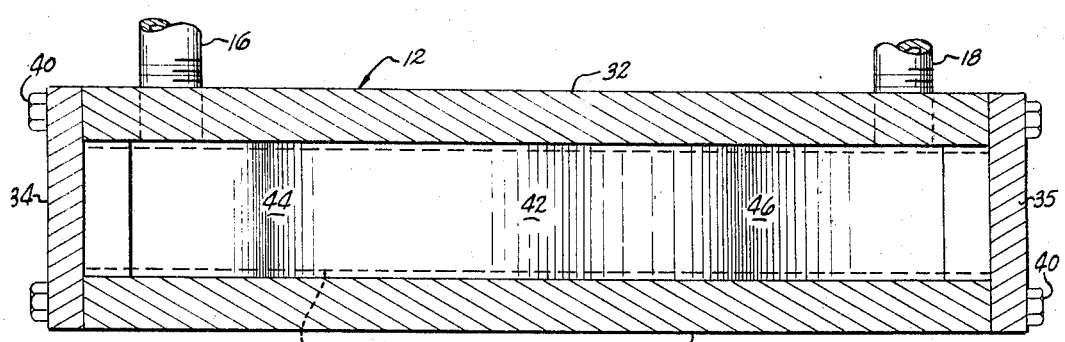
FIGURE 3 is a section taken on line 3—3 of FIG. 2.

Referring to FIGS. 1–3, a fluid proportioning system constructed in accordance with one aspect of the present invention generally comprises a fluid motor 12 on which a diaphragm pump 14 is mounted for actuation by the motor. Adjacent one end of motor 12 is an inlet connection 16 arranged to receive a main fluid from a source (not shown). An outlet connection 18 is provided at the opposite end of motor 12 for connection to a utilizatin device (not shown). An inlet line 20 communicates with pump 14 to supply a fluid additive to the pump and an outlet line 22 connects pump 14 with motor 12 adjacent to the outlet connection 18. In general when fluid flows from the inlet connection 16 through motor 12 and out of connection 18, in a direction from left to right as viewed in FIGS. 1–3, motor 12 actuates pump 14 to introduce the fluid additive into the main fluid adjacent the outlet connection 18 at a rate related to the main fluid flow rate.

More particularly motor 12 comprises a walled chamber 26 formed by a top plate 28, a bottom plate 30, a pair of side plates 32, 33 and a pair of end plates 34, 35 all of which are assembled together by screws 40. Chamber 26 has a rectangular longitudinal cross section and a rectangular transverse cross section formed by flat interior faces on the plates 28, 30, 32, 33. Mounted in chamber 26 is a resiliently flexible wall 36 which is fastened at one end in end plate 34 and at the other end in end plate 35. The flexible wall 36 is fashioned from a flat strip 38 of spring steel encased by laminations 40 which cover both sides and both longitudinal edges of strip 38. The laminations 40 may be strips of neoprene bonded on the steel strip 38. Wall 36 is compressed longitudinally, in a direction axially of chamber 26, against the spring action of strip 38 so that the wall assumes a wave-like or undulatory configuration shown in full lines in FIG. 2 with a first arcuate crest 42 abutting plate 28 midway between end plates 34, 35, a second crest 44 abutting plate 30 between crest 42 and end plate 34 and a third crest 46 abutting plate 30 between crest 42 and end plate 35. Terminal portions 48, 50 of wall 36 project inwardly of chamber 26 a short distance along a generally straight path midway between the top plate 28 and the bottom plate 30. The inlet connection 16 is also disposed midway between plates 28, 30 and adjacent plate 34 to communicate with chamber 26 above and below the terminal portion 48. Similarly the outlet connection 18 communicates interiorly of chamber 26 with both the upper and the lower surfaces of terminal portion 50 adjacent plate 35.

With wall 36 mounted in compression in the chamber 26, the wall is self-supporting and assumes one of two stable states, one state having the configuration illustrated in full lines in FIG. 2 and the other state having a reversed configuration illustrated in dashed lines in FIG. 2. In the second stable state illustrated in dashed lines, the central portion of wall 36 which formed crest 42 is reversed to form a crest 60 which abuts plate 30 midway between plates 34, 35; the left-hand portion of wall 36 which formed crest 44 is reversed to form a crest 62 which abuts plate 28 between end plate 34 and crest 60; and the right-hand portion of wall 36 which formed crest 46 is reversed to form a crest 64 which abuts plate 28 between plate 35 and crest 60. Fluid flowing through chamber 26 causes wall 36 to switch between the two stable states with a rapid snapping action. Crests 44, 46 and 60 seal with plate 30 throughout the full width of chamber 26 and crests 42, 62, 64 also seal with plate 28 across the full width of chamber 26 so that fluid does not leak past the crests when wall 36 is in either of its stable states. The longitudinal edges of wall 36 also seal with plates 32, 33 so that fluid progresses through chamber 26 in any substantial quantity only during transition of wall 36 between its stable states.

The pump 14 generally comprises a lower housing 70 formed with a vertical cylinder 72 in which a piston 74 is slidably mounted. A flexible diaphragm 76 is mounted below piston 74 across cylinder 72 with a peripheral portion of the diaphragm sandwiched between housing 70 and plate 28 to sealably retain the diaphragm 76 in place when pump 14 is fastened on motor 12. A plunger 80 is fashioned with an upper rounded head 82 which seats on the lower face of diaphragm 76. Plunger 80 also has a shank portion 84 which extends slidably through an aperture 86 in the top plate 28 and is arranged to project into chamber 26 when wall 36 is in its second state shown in dashed lines and to be engaged by crest 42 when wall 36 is in its first state illustrated in full lines. A pin 88 is fastened at its lower end in piston 74 and projects upwardly through housing 70 into a pump cavity 90 fashioned in the upper face of housing 70 and in the bottom face of an upper housing 92. A second diaphragm 94 is disposed across cavity 90 with a peripheral portion of diaphragm 94 sealed and retained between housings 70, 92. Communicating with the upper portion of cavity 90 above diaphragm 94 is an inlet passageway 95 in housing 92. Passageway 95 communicates with line 20 through a one-way check valve 96 which is biased to a closed position by a compression spring 97. The upper portion of cavity 90 is also connected to the outlet line 22 through a passageway 98 and a spring biased check valve 99. The upper end of pin 88 is fastened to diaphragm 94 to flex diaphragm 94 when piston 74 moves up and down cylinder 72. A compression spring 100 is disposed between piston 74 and a lower face on housing portion 70 to urge plunger 80, diaphragm 76, piston 74, pin 88 and diaphragm 94 to a lower position. A passageway 102 in plate 28 connects cylinder 72 below diaphragm 76 with chamber 26 adjacent connection 18 so that fluid which seeps past plunger 80 does not retard the action of spring 100.

With wall 36 disposed in the undulatory configuration illustrated in full lines in FIG. 2, and with fluid entering chamber 26 under pressure through connection 16, a first pressure $P_1$ (FIG. 7a) will be established within crest 44 in a zone bounded by plates 28, 32, 33, 34 and the upper surface of wall 36 between crest 42 and plate 34. The same pressure is also present in a small space defined by the lower surface of wall 36, and plates 30, 32, 33, 34. A second pressure $P_2$ exists underneath crest 42 in a zone bounded by plates 30, 32, 33 and the lower surface of wall 36 between crests 44 and 46. Additionally, a third pressure $P_3$ exists within crest 46 in a zone bounded by plates 28, 32, 33, 35 and the upper surface of wall 36 between crest 42 and plate 35. Pressure differences wthin crests 42, 44, 46 tend to compress wall 36 in a direction axially of chamber 26, from left to right as viewed in FIGS. 7a–7c. The pressure $P_1$ increases until wall 36 distorts to a point where the wall shifts with a rapid snap action to the other state (FIG. 7c) illustrated in dashed lines in FIG. 2. Pressure again builds up adjacent inlet connection 16, under crest 62 so that the flexible wall 36 snaps to its first stable position (FIG. 7a) illustrated in full lines in FIG. 2. So long as fluid enters chamber 26 under pressure wall 36 switches between its two stable states at a rate proportional to the flow rate of the fluid. Each time wall 36 changes from one stable state to the other, fluid in chamber 26 progresses from the inlet connection 16 toward the outlet connection 18. For example, fluid under crest 44 moves to a position under crest 60 and fluid under crest 42 moves to a position under crest 64 when wall 36 switches from its position illustrated in full lines to the position illustrated in dashed lines. Additionally each time wall 36 switches from its position illustrated in dashed lines to the position illustrated in full lines, crest 42 engages plunger 80 and urges diaphragm 76, piston 74, pin 88 and diaphragm 94 to a raised position so that the fluid additive in cavity 90 is pumped through valve 99 and outlet line 22 into the chamber 26 adjacent outlet connection 18 where it mixes with the main fluid in chamber 26. Each time the flexible wall 36 switches from its position illustrated in full lines to its reverse position illustrated in dashed lines, spring 100 returns plunger 80, diaphragm 76, piston 74, pin 88 and diaphragm 94 to a lowered position to draw the fluid additive into the cavity 90 through inlet line 20 and check valve 96.

In the embodiment illustrated in FIG. 4, a fluid motor 104 and a diaphragm pump 106 are similar in many respects to the fluid motor 12 and the pump 14 illustrated in FIGS. 1–3 with similar elements being designated by like reference numerals. An inlet connection 107 is fastened in one end plate 108 in fluid communication with chamber 26 at opposite surfaces of wall 36 which is fastened at one end in plate 108. Fluid entering chamber 26 through the inlet connection 107 is supplied above and below wall 36. Similarly the other end of the wall 36 is fastened in an end plate 109 centrally of an outlet connection 110 so that fluid above and below wall 36 can leave chamber 26 through the outlet connection 110. The actuation of the flexible wall 36 by fluid flowing through chamber 26 from left to right as viewed in FIG. 4 is substantially identical to that described in connection with FIGS. 1–3 and 7a–7c.

Pump 106 includes a pumping diaphragm 114 operatively disposed in a pumping cavity 116 and arranged to pump fluid additives from a suitable source through an inlet line 118 and a check valve 120 to the chamber 26 through an outlet check valve 124 and a line 126 which communicates with chamber 26 at its outlet end immediately adjacent the outlet connection 110. Diaphragm 114 is actuated by a plunger 130 which is fastened at its lower end to a power diaphragm 132 operatively disposed in a cavity 134. Diaphragm 114, plunger 130 and diaphragm 132 are urged in a downward direction by a compression spring 136 seated on the upper face of the diaphragm 132. The upper face of diaphragm 132 is vented into chamber 26 through a passageway 140 which opens into chamber 26 at a position designated by numeral 142 downstream of crest 42 and upstream of crest 64. The bottom face of diaphragm 132 is vented into cavity 26 by a passageway 144 which opens into cavity 26 at a position designated by 146 upstream of crest 42 and downstream of crest 62. Diaphragm 132 has an effective area greater than diaphragm 114 to provide pressure multiplication.

With the flexible wall 36 in the position schematically illustrated in FIG. 7a, just before wall 36 snaps to its reverse position, the lower face of diaphragm 132 will be subjected to a pressure $P_1$ through passageway 114 with a pressure $P_3$ being exerted on the upper face of diaphragm 132. The pressure difference between $P_1$ and $P_3$ is sufficient to overcome spring 136 and raise the diaphragm 132, plunger 130 and diaphragm 114 to pump fluid additives from cavity 116 through valve 124 and line 126 in chamber 26 adjacent the outlet connection 110. As the pressure $P_1$ increases wall 36 compresses slightly to the distorted configuration illustrated in FIG. 7b until a point is reached where the diaphragm snaps over into its reverse position illustrated in FIG. 7c and in full lines in FIG. 4. With the flexible wall 36 in this position equal fluid pressures $P_2$ are exerted on both sides of diaphragm 132 and spring 136 expands moving diaphragm 114 downwardly to the position illustrated in full lines in FIG. 4 to draw fluid additives through line 118 and valve 120 into cavity 116. With fluid flowing continuously through chamber 26 the diaphragm 36 repeatedly switches between its two stable states varying the pressure on diaphragm 132 and continuously actuating diaphragm 114 to pump the fluid additives into chamber 26. Again the rate at which wall 36 switches between its two stable states is proportional to the rate at which fluid flows through chamber 26 and thus the rate at which additives are pumped into chamber 26 is proportional to the flow rate of the main fluid.

Although a double diaphragm pump is illustrated in the embodiment shown in FIG. 4 to obtain higher pressures in the pump 106 it will be understood that a single diaphragm can be used for certain applications. As illustrated in FIG. 6 a diaphragm pump 150, similar in many respects to pumps 14 (FIG. 1), 106 (FIG. 4) with like elements being designated by like reference numerals, includes a single diaphragm 152 disposed across a cavity 153 with the pressure side of diaphragm 152 in fluid communication with chamber 26 by means of a passageway 154 opening between crests 42, 64. Pressure pulsations from chamber 26 created by the motion of wall 36 are conducted to diaphragm 152 to operate pump 150. Diaphragm 152 is biased to the position illustrated by a compression spring 156. Thus the pressure difference $(P_2-P_3)$ must be sufficient to overcome spring 156. Diaphragm 152 could also be operated by the pressure difference $P_1-P_2$ by connecting passageway to chamber 26 between crests 42, 62.

With the embodiments illustrated in FIGS. 4 and 6 the pump (106, FIG. 4; 150, FIG. 6) can be located remotely from the fluid motor 26 with passageways 140, 144, 154 being replaced by suitable line connections. In each of the embodiments herein described all of the parts can be fabricated from plastic or other suitable non-corrosive materials. Heat generated by the action of wall 36 is small and there is little, if any, likelihood of sparking so that the fluid motor and fluid proportioning system can be used with volatile and explosive fluids. The flexible wall 36 can also be constructed from strips of other materials, such as plastic, having a resiliency required to achieve the desired snap or switching action between the two stable states and thus eliminate the separate spring strip 38. The fluid proportioning systems and fluid motors described herein can be constructed simply and economically for use in various applications, for example, to introduce fertilizers, fungicides, germicides, insecticides, weed killers and cleaning agents, etc., into a water stream. Although the flexible wall 36 has been described generally in connection with a fluid motor, and particularly in a fluid proportioning system, the motion of wall 36 is also useful for other applications, for example, rough flow rate measurements which can be derived by monitoring the rate at which the diaphragm switches. The switching rate of the movable wall 36 could be monitored magnetically eliminating direct connection with chamber 26.

It will be understood that the fluid motor system which is herein disclosed and described is presented for purposes of explanation and illustration and is not intended to indicate limits of the invention, the scope of which is defined by the following claims.

What is claimed is:

1. In a fluid proportioning system, a first line arranged and adapted to carry a first fluid, a second line arranged and adapted to carry a second fluid, and means operatively coupled to said first line and to said second line for introducing said second fliud into said first fluid at a rate related to flow of said first fluid in said first line comprising means forming a walled chamber in said first line, a flexible wall mounted in said chamber in an undulatory configuration to form a series of oppositely directed crests, said flexible wall being responsive to flow of said first fluid through said chamber to undergo undulatory motion at a rate related to flow of said first fluid through said chamber, pumping means having an inlet and an outlet, said inlet being in fluid communication with said second line, said outlet being in fluid communication with said first line, and means operative in response to said undulatory motion of said movable wall to actuate said pumping means.

2. The system set forth in claim 1 wherein said flexible wall is formed of resilient material and is mounted in said chamber resiliently compressed in a direction of flow of said first fluid with adjacent ones of said crests sealably abutting opposite walls of said chamber, said flexible wall having two stable states with every other crest abutting one of said opposite walls in one state and corresponding reversed crests abutting the other of said opposite walls in the other state.

3. The system set forth in claim 2 wherein a first crest abuts a first one of said opposite walls and a second crest adjacent said first crest abuts a second one of said opposite walls when said flexible wall is in one state, said first crest reversing to form a third crest abutting said second wall when said flexible wall is in its other state, and said actuating means comprises a passageway communicating at one end exteriorly of said walled chamber and communicating at its other end interiorly of said walled chamber at a zone bounded by said second wall, said second crest and said third crest.

4. The system set forth in claim 3 wherein said pumping means includes a hollow housing having a flexible diaphragm mounted therein, said diaphragm forming a pressure chamber in said housing at one side of said diaphragm, and said passageway communicating at said one end with said pressure chamber.

5. The system set forth in claim 4 wherein said housing includes a second pressure chamber at an opposite side of said diaphragm, said flexible wall has a fourth crest adjacent said first crest and abutting said second wall when said flexible wall is in said one state, and said actuating means further comprises a second passageway communicating at one end with said second pressure chamber and at its other end interiorly of said walled chamber in a second zone bounded by said second wall, said third crest and said fourth crest.

6. The system as set forth in claim 2 wherein said flexible wall has one crest that abuts said other opposite wall to form a first sub-chamber in said walled chamber when said flexible wall is in one state with said one crest being reversed and abutting said one opposite wall when said flexible wall is in said other state, and said actuating means comprises a plunger slidably mounted through said one wall, means yieldably urging said plunger in a direction interiorly of said walled chamber with an inner end of said plunger projecting into said first sub-chamber when said flexible wall is in said one state, said plunger being arranged and adapted to be engaged by said flexible wall to move said plunger in a direction exteriorly of said walled chamber when said flexible wall shifts from said one state to said other state.

7. A fluid motor comprising means forming a walled chamber having an inlet at one end and an outlet at the other end, said chamber being arranged to accommodate fluid flowing through said chamber in a direction from said inlet to said outlet, a flexible wall mounted in said chamber and having an undulatory configuration to form a series of oppositely directed crests, adjacent ones of said crests sealably abutting opposite walls of said chamber and every other crest abutting one of said opposite walls, said flexible wall being responsive to fluid flow through said chamber in a direction from said inlet to said outlet to undergo undulatory motion at a rate related to flow of fluid through said chamber, and means responsive to said undulatory motion of said flexible wall to provide an output which varies in a manner related to flow of fluid in said chamber.

8. The fluid motor set forth in claim 7 wherein said flexible wall is formed of resilient material and said flexible wall is mounted in said chamber in compression in a direction of flow through said chamber to form at least three crests in said alternating series of crests.

9. The fluid motor set forth in claim 7 wherein said flexible wall comprises a strip of resilient material having a normally flat configuration and said strip is mounted in said chamber in longitudinal compression to impart said undulatory configuration to said flexible wall.

10. The fluid motor set forth in claim 9 wherein said strip has straight parallel edges, said chamber is formed with an upper wall, a lower wall, and a pair of side walls, and said edges of said strip fit closely and slidably with said side walls, one side of said strip abutting one of said opposite walls at two crests, and the other side of said strip abutting said opposite wall at one crest.

11. The fluid motor set forth in claim 7 wherein said flexible wall is in the form of a resilient strip mounted in said chamber compressed in a direction of flow in said chamber and said flexible wall has two stable states with every other crest abutting one of said opposite walls in one state and corresponding reversed crests abutting the other of said opposite walls when said flexible wall is in the other state.

12. The fluid motor set forth in claim 11 wherein said output means comprises a plunger extending slidably through a wall of said chamber in a direction generally perpendicular to said flexible wall and having an inner end disposed to be engaged by said flexible wall when said flexible wall moves from one state to the other state.

13. The fluid motor set forth in claim 11 wherein a first crest abuts a first one of said opposite walls and a second crest adjacent said first crest abuts a second one of said opposite walls when said flexible wall is in one state, said first crest reversing to form a third crest abutting said second wall when said flexible wall is in its other state, and said output means comprises a passageway communicating at one end exteriorly of said walled chamber and communicating at the other end interiorly of said walled chamber at a zone bounded by said second wall, said second crest and said third crest.

14. The fluid motor set forth in claim 13 wherein said output means includes a hollow housing having a flexible diaphragm mounted therein to form a pressure chamber at one side of said diaphragm, and said passageway communicates at said one end with said pressure chamber.

15. The fluid motor set forth in claim 14 wherein said housing includes a second pressure chamber at an opposite side of said diaphragm, said flexible wall has a fourth crest adjacent said first crest and abutting said second wall when said flexible wall is in said one state, and said output means further comprises a second passageway communicating at one end with said second pressure chamber and at its other end interiorly of said walled chamber at a zone bounded by said second wall, said third crest and said fourth crest.

References Cited by the Examiner
UNITED STATES PATENTS

| | | | |
|---|---|---|---|
| 862,867 | 8/1907 | Eggleston | 230—50 |
| 2,888,877 | 6/1959 | Shellman et al. | 103—53 |

ROBERT M. WALKER, *Primary Examiner.*